(12) United States Patent  
Burns (10) Patent No.: US 6,478,203 B2  
(45) Date of Patent: Nov. 12, 2002

(54) GOLF BAG AND CART CARRIER

(76) Inventor: Jane Burns, 104 Pointe Cir., Santa Rosa Beach, FL (US) 32459

( * ) Notice: Subject to any disclaimer, the term of this patent is extended or adjusted under 35 U.S.C. 154(b) by 0 days.

(21) Appl. No.: 09/873,442

(22) Filed: Jun. 5, 2001

(65) Prior Publication Data

US 2001/0048011 A1 Dec. 6, 2001

Related U.S. Application Data

(60) Provisional application No. 60/209,482, filed on Jun. 6, 2000.

(51) Int. Cl.⁷ ................................................. B60R 9/00
(52) U.S. Cl. .................. 224/510; 224/495; 224/519; 224/525; 224/527; 206/315.3; 206/315.7; 280/47.17; 280/47.19; 280/DIG. 6; D34/15
(58) Field of Search ................................ 224/495, 510, 224/519, 521, 527, 526, 525, 274; 206/315.3, 315.7; 280/47.17, 47.19, DIG. 6; D34/15

(56) References Cited

U.S. PATENT DOCUMENTS

| | | | |
|---|---|---|---|
| 3,726,537 A | * 4/1973 | McLoughlin | ............ 280/47.26 |
| 4,012,051 A | 3/1977 | Embinder | |
| 4,061,257 A | 12/1977 | St. Clair | |
| 4,337,882 A | * 7/1982 | Hampton | .................. 211/70.2 |
| 4,375,847 A | 3/1983 | Picco | |
| D268,574 S | 4/1983 | Hampton | |
| D269,225 S | 6/1983 | Picco | |
| 4,533,013 A | 8/1985 | Hightower | |
| 4,726,597 A | 2/1988 | Hickin | |
| 4,796,789 A | 1/1989 | Willcocks | |
| 4,889,267 A | * 12/1989 | Bolton | ........................ 224/274 |
| D319,346 S | 8/1991 | Jessen | |
| 5,168,992 A | 12/1992 | Bowdy | |
| 5,556,064 A | 9/1996 | Cowe | |
| 5,582,290 A | 12/1996 | McCuaig et al. | |
| 5,727,642 A | * 3/1998 | Abbott | ........................ 180/6.5 |
| D394,950 S | 6/1998 | Kite | |
| 5,806,738 A | 9/1998 | D'Angelo | |
| 5,868,247 A | * 2/1999 | Schrader | .................. 206/315.4 |
| 5,924,709 A | * 7/1999 | Yang | ..................... 280/47.131 |
| 6,039,227 A | * 3/2000 | Stark | ........................ 206/315.3 |
| 6,126,050 A | * 10/2000 | Aliano, Jr. | ............... 206/315.2 |
| 6,330,944 B1 | * 12/2001 | DeMichele | .................. 206/278 |

FOREIGN PATENT DOCUMENTS

EP 0 128 088 A1 12/1984

* cited by examiner

Primary Examiner—Stephen K. Cronin  
(74) Attorney, Agent, or Firm—Richard C. Litman (57) ABSTRACT

A carrier and hitch assembly comprises a rigid, elongated housing having a door covered opening on a front face. The housing is large enough to contain a standard size golf bag and a complete set of clubs. The housing is provided with wheels and a handle so that the housing may be utilized in cart-like fashion. The rear face of the housing is provided with structure for attaching the housing to a hitch assembly for transporting the housing at the rear of an automotive vehicle or golf cart.

20 Claims, 10 Drawing Sheets

GOLF BAG AND CART CARRIER

CROSS-REFERENCE TO RELATED APPLICATION

This application claims the benefit of U.S. Provisional Patent Application Serial No. 60/209,482, filed Jun. 6, 2000.

BACKGROUND OF THE INVENTION

1. Field of the Invention

The present invention generally relates to portable carriers. More specifically, the present invention is drawn to a travel case for storing and transporting a golf bag and clubs.

2. Description of Related Art

Transporting a golf bag loaded with a full set of clubs is a less than enjoyable task for most players, especially senior citizens. Lifting the loaded bag in and out of an automobile trunk or SUV storage area onto a golf cart requires that the bag is shifted from vertical to horizontal and back to vertical. The awkwardness presented by such shifting creates undue strain on the back and shoulder muscles that could cause an injury. Also, the bag and the automobile are subjected to unnecessary wear and tear when the bag is jammed into the trunk with the bags of the other players in the foursome.

Vacations present a whole new set of problems. Getting a heavy, fully loaded bag along with other luggage to the airport, on an airplane and to the hotel can often be a vacation-dampening chore. A combination golf bag storage and carrier device designed to alleviate the aforementioned problems would be a welcome addition in the art.

Examples of carriers for transporting and/or storing golf clubs are disclosed in U.S. Pat. No. Des. 269,225 (Picco), Des. 319,346 (Jessen), Des. 394,950 (Kite), U.S. Pat. No. 4,012,051 (Embinder), U.S. Pat. No. 4,375,847 (Picco), U.S. Pat. No. 4,796,789 (Willcocks), U.S. Pat. No. 5,168,992 (Bowdy) and U.S. Pat. No. 5,582,290 (McCuaig et al.). It is noted that the above cited patentees do not contemplate transporting and/or storing a separate golf bag, nor do they contemplate providing means to mount a carrier to the outside of an automotive vehicle.

U.S. Pat. No. Des. 268,574 (Hampton), U.S. Pat. No. 4,061,257 (St. Clair), U.S. Pat. No. 4,337,882 (Hampton), U.S. Pat. No. 4,726,597 (Hickin) and U.S. Pat. No. 5,806,738 (D'Angelo) show apparatus for mounting a golf bag and/or golf cart to the rear of an automobile or the like. The patents do not show a wheeled carrier for storing and/or transporting both a golf bag and golf clubs therein.

U.S. Pat. No. 5,556,064 (Cowe) discloses a cradle for supporting a single golf bag in the trunk of an automobile.

U.S. Pat. No. 4,533,013 (Hightower) shows a motorized golf cart having golf bag supporting brackets mounted on the rear end thereof.

EP Patent number 0 128 088 A1 shows a device to carry luggage mounted to a trailer hitch.

None of the above inventions and patents, taken either singly or in combination, is seen to disclose a portable carrier and hitch assembly for a golf bag and clubs as will subsequently be described and claimed in the instant invention.

SUMMARY OF THE INVENTION

The instant invention is drawn to a carrier for a golf bag and clubs in combination with a hitch assembly for supporting the carrier at the rear of an automotive vehicle or a motorized golf cart.

The carrier comprises a rigid, elongate housing with an enclosed volume of a capacity to contain a conventional golf bag having at least a full set of golf clubs therein. A hinged door is provided on the front of the housing for easy access to the enclosed volume. The housing is also provided with wheels and a movable handle so that the housing may be utilized in cart-like fashion. A rigid handle is fixed at each side of the housing to facilitate lifting. In a first embodiment, the movable handle is positioned in a contoured holder, which holder is fixed on the rear of the housing. The contoured holder is shaped so that it may be attached to a hitch assembly especially designed to support the housing.

The hitch assembly of the first embodiment comprises a horizontally positioned, tubular support member of T-shaped configuration. The free end of the leg of the T is adapted to be rigidly attached to a trailer hitch mounting bar of a vehicle. The head of the T has at least one mounting bracket rigidly attached to one face thereof. A cylindrical support is rigidly attached to a second face of the T directly opposite the mounting bracket. The bracket and cylindrical support function to engage at least one housing and support the housing at the rear of the vehicle for transportation as will be further explained below.

In a second embodiment, the carrier is adapted to nest into a specially designed tray, which tray is adapted to be hitched to the rear of a towing vehicle.

Accordingly, it is a principal object of the invention to provide a carrier constructed to store and transport a golf bag having a full set of golf clubs therein.

It is a further object of the invention to provide a carrier constructed to store and transport a golf bag and golf clubs, which carrier has wheels at one end so that the carrier can be utilized in cart-like fashion.

Still another object of the invention is to provide a carrier constructed to store and transport a golf bag and golf clubs, which carrier may be mounted to a unique hitch assembly.

It is an object of the invention to provide improved elements and arrangements thereof in an apparatus for the purposes described which are inexpensive, dependable and fully effective in accomplishing their intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
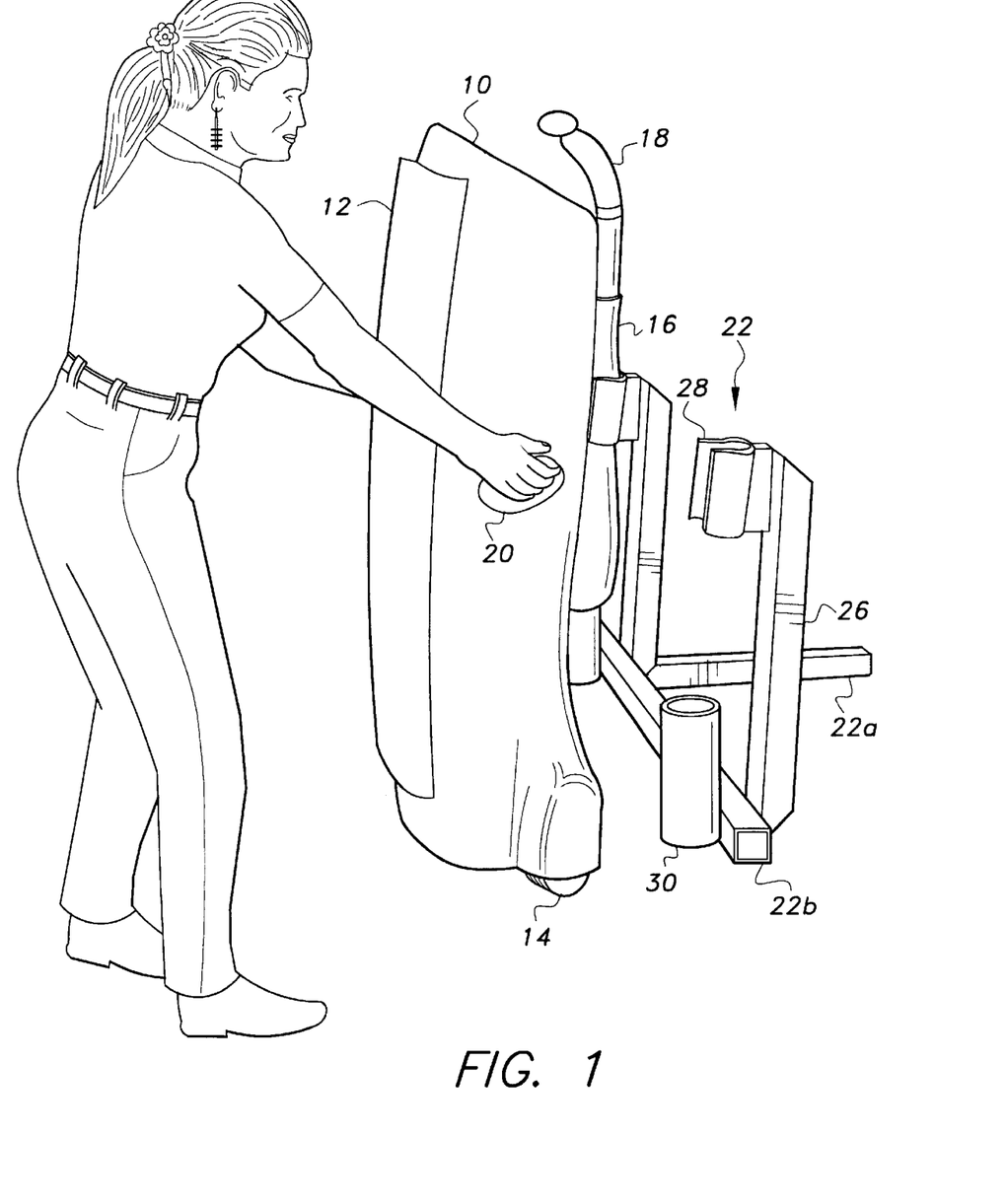
FIG. 1 is an environmental, perspective view of a golf bag carrier and hitch assembly according to a first embodiment of the present invention.
Figure 2:
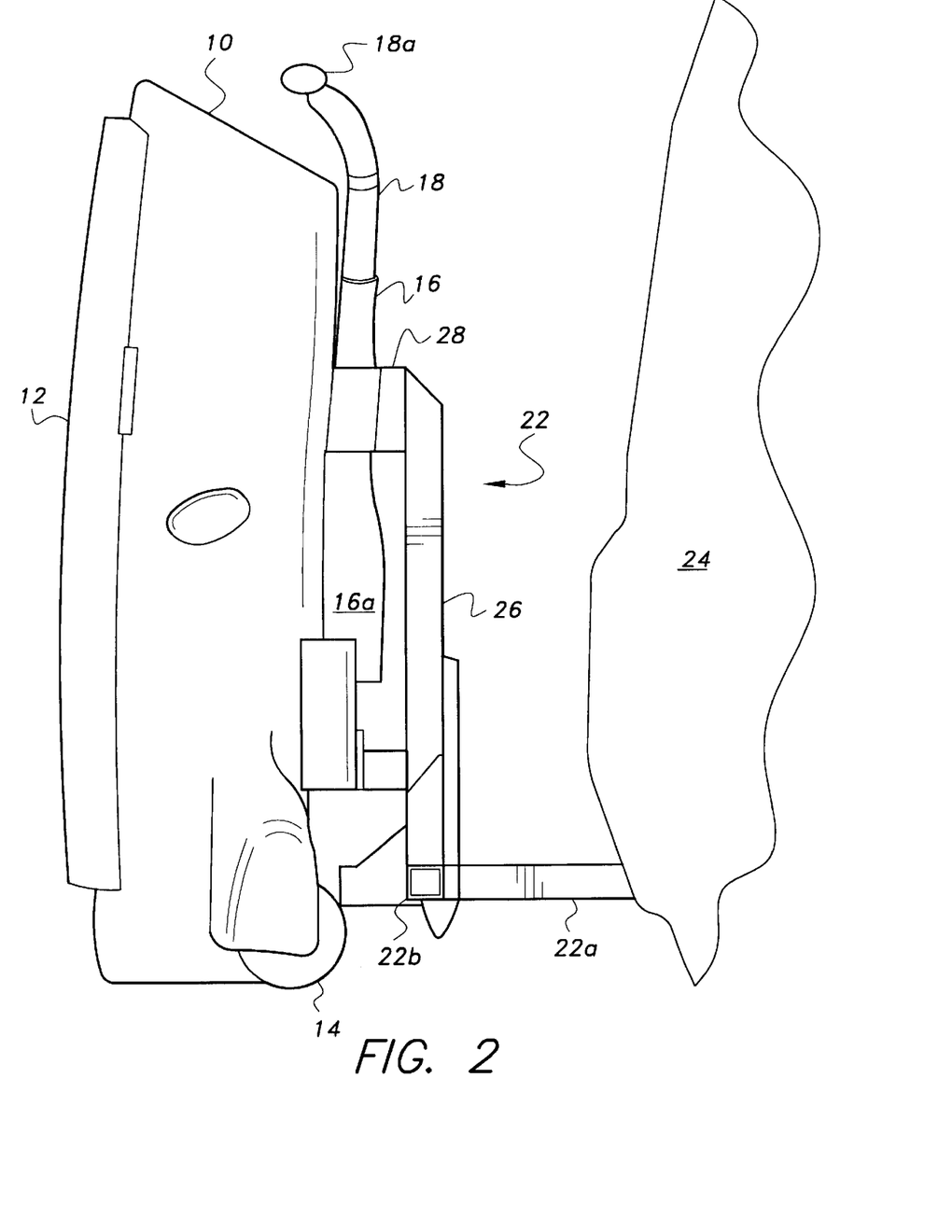
FIG. 2 is a side view of a golf bag carrier and hitch assembly according to a first embodiment of the present invention.
Figure 3:
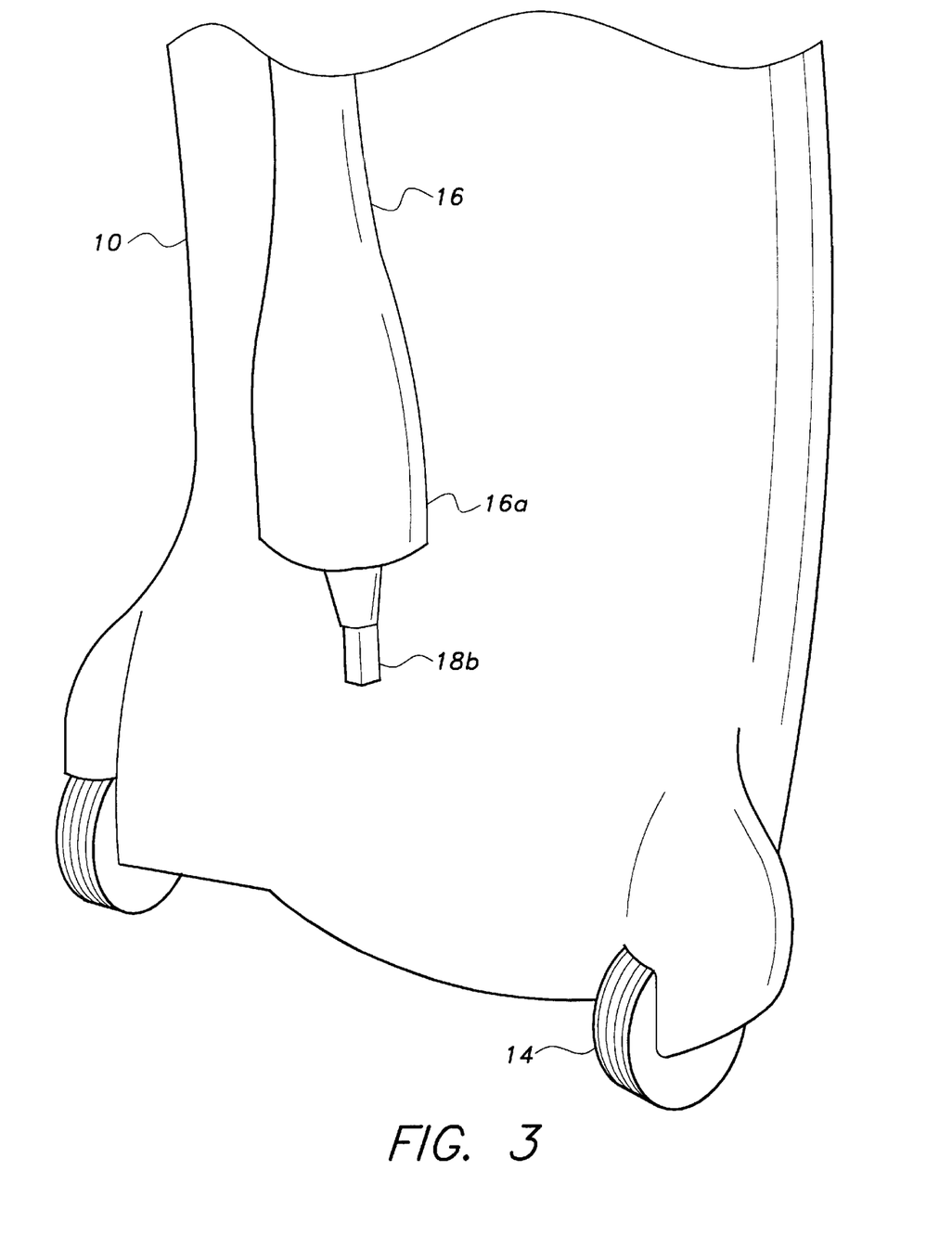
FIG. 3 is a partial rear view of a golf bag carrier according to a first embodiment of the present invention.

Attention is directed to FIGS. 1–3 which illustrate a first embodiment of a portable carrier. The carrier is a one-piece, weatherproof housing 10 fabricated from a hard, rugged, plastic material, or the like, which forms a shell enclosing a volume large enough to house a golf bag (not shown) containing at least a full set of golf clubs. The interior of the housing is cushioned to protect the bag and clubs when the housing is being transported. An opening is formed in the front of housing 10 to facilitate the loading and removal of the golf bag. A hinged door 12 is positioned for covering and uncovering the opening in a conventional manner. Door 12 may be provided with locking means if desired. Door 12 will normally be fabricated from the same material as housing 10 although a different material may be used if desired. Wheels 14 are rotatably attached to the lower end of housing 10. A tubular member 16 is attached to the rear face of housing 10. Tubular member 16 assumes a flared configuration at its lower end 16a for reasons as will be explained below. Member 16 may be attached in any convenient and efficient manner (gluing, molding, etc.). A handle 18 is disposed in tubular member 16. Handle 18 has an upper end 18a which extends slightly above the top of carrier 10. The lower end 18b extends below the lower end 16a of tubular member 16. Handle 18 is fitted for swivel movement in member 16. Handle 18 may be fabricated from any suitable material (wood, metal, plastic, etc.). A set-in handle 20 is positioned on each side of housing 10 to facilitate lifting the housing.

Figure 4:
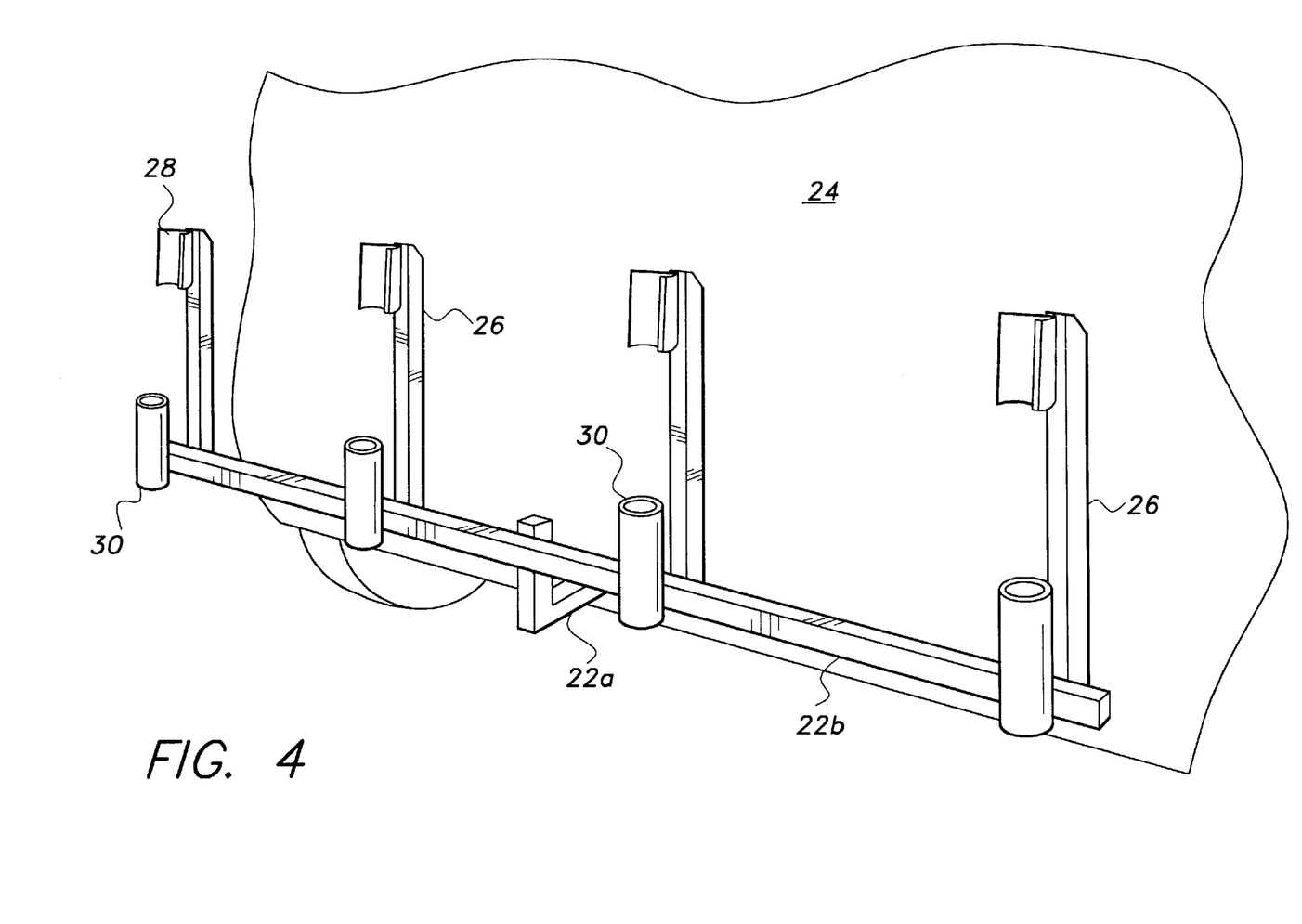
FIG. 4 is a perspective view of a hitch assembly according to a first embodiment of the present invention.

A hitch assembly generally designated at 22 is specially designed to support at least one housing from the rear of a vehicle generally designated at 24. Vehicle 24 may take on the form of an automotive type (car, Suv, truck, etc.) or the vehicle may be a motorized golf cart. Hitch assembly 22 is adapted to be fastened to the conventional trailer hitch mounting bar of either vehicle type. As best seen in FIGS. 1, 2, and 4, hitch assembly 22 comprises a T-shaped support member having a leg 22a and head 22b. Leg 22a extends perpendicularly from head 22b and has an end adapted to be attached to a conventional trailer hitch mounting bar (not shown). Head 22b extends horizontally in spaced, parallel relationship with vehicle 24. Leg 22a and head 22b may be fabricated from any strong and durable metal stock. A mounting bracket 26 has a lower end attached to a front face of head 22b. A U-shaped stabilizing clip 28 is attached to the upper end of mounting bracket 26. A cylindrical stub 30 is attached to a rear face of head 22b directly opposite bracket 26. Stub 30 is open at its upper end. Bracket 26 and stub 30 are fabricated from metal and may be attached to head 22b in any efficient manner i.e. screws, bolts, welds. Unshaped clip 28 is sized to receive and tightly retain the upper end of tubular member 16. Stub 30 is sized to be received in the flared lower end 16a of tubular member 16.

Figure 5:
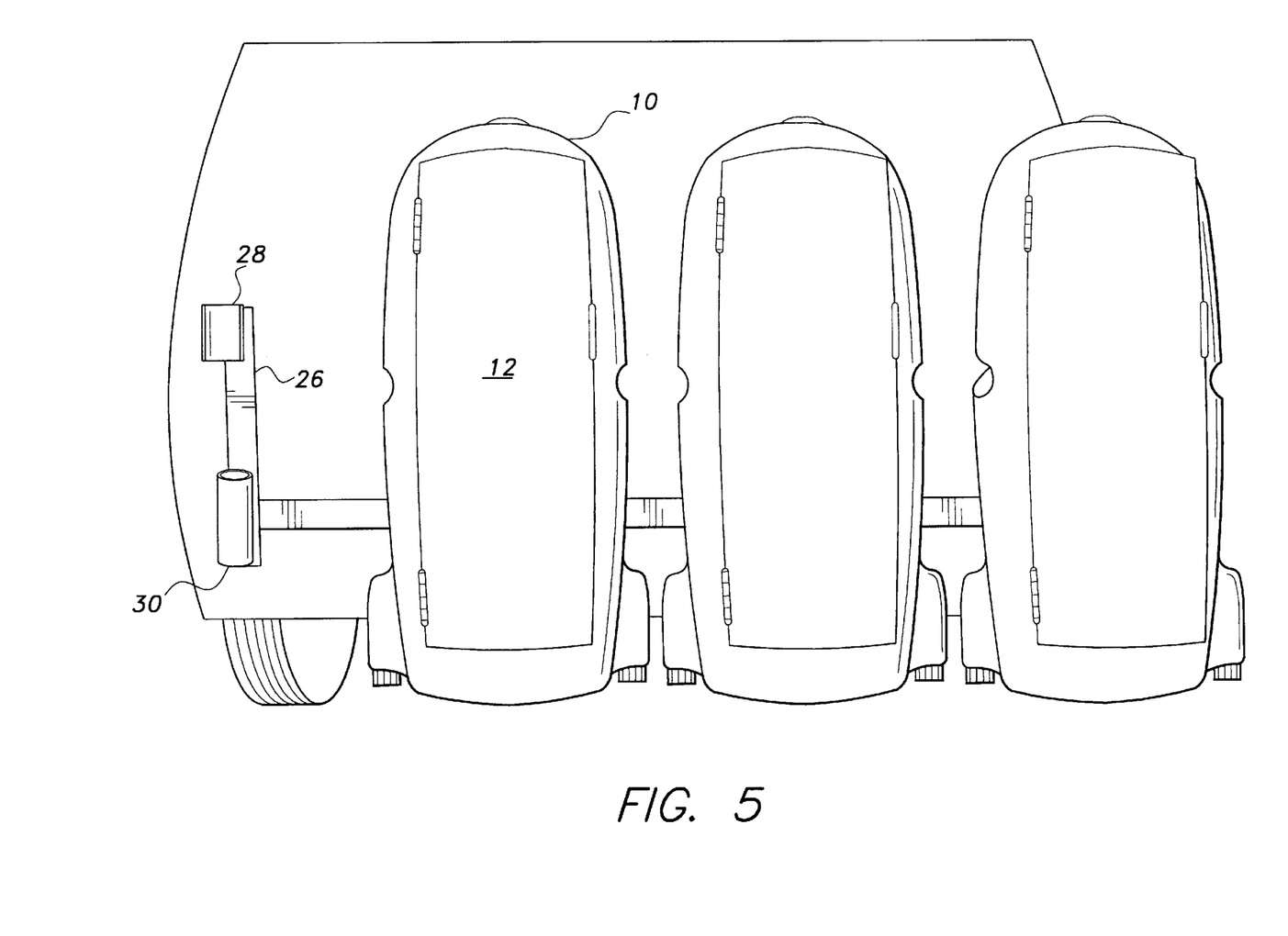
FIG. 5 is a rear view of multiple carriers mounted to a hitch assembly according to a first embodiment the present invention.

Thus, housing 10 can be stabilized and supported on hitch assembly 22 for transportation to and from the golf course without taking up interior car or trunk space. Means (not shown) may be provided to lock the housing to the hitch assembly if desired. The housing is easily loaded and unloaded from the hitch assembly with a minimum of bending and the housing can be wheeled like a cart after unloading. As best seen in FIGS. 4 and 5, plural brackets and stubs are provided so that a number of housings may be towed by a single vehicle.

Figure 6:
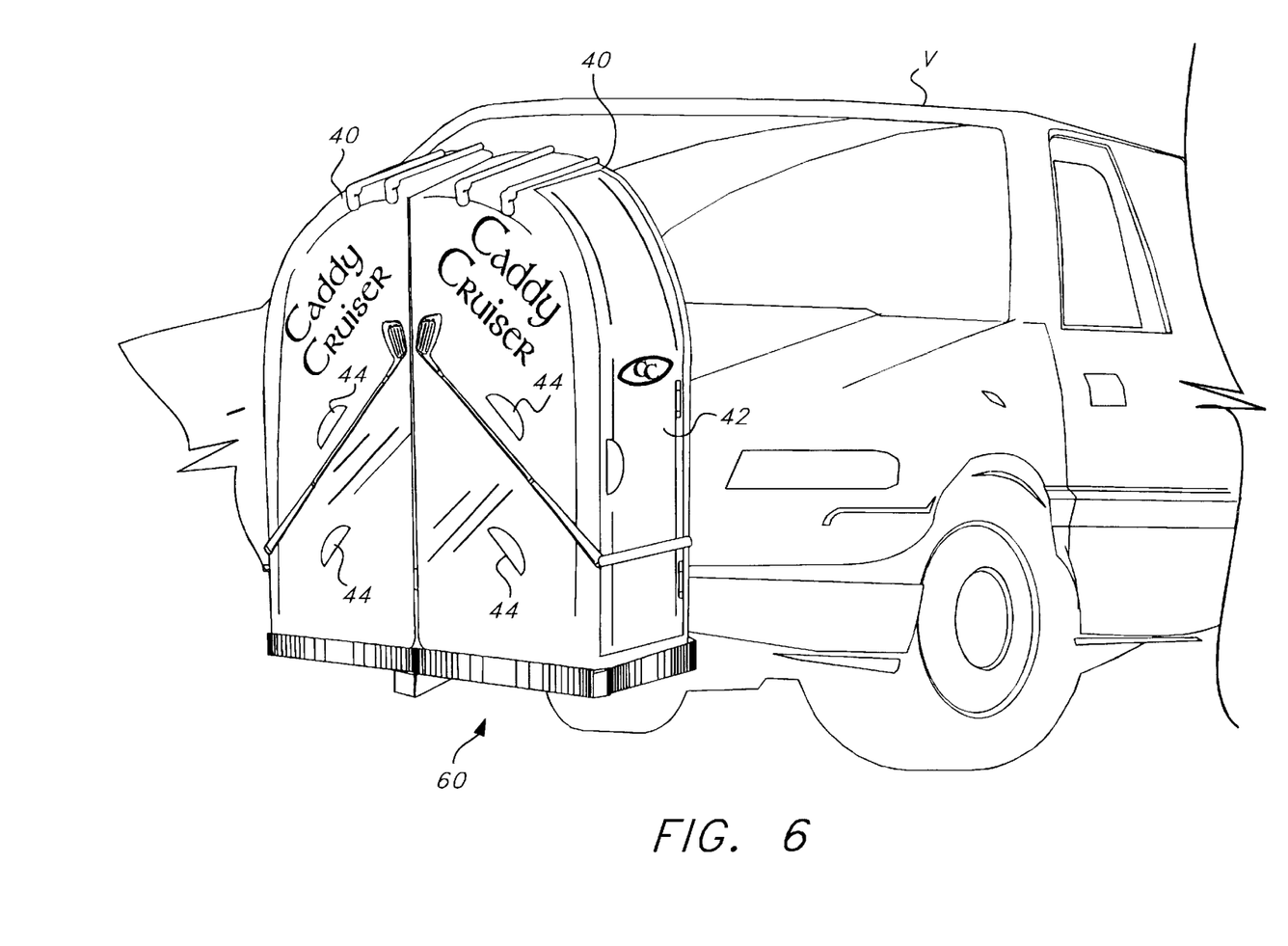
FIG. 6 is an environmental, perspective view of a golf bag carrier an hitch assembly according to a second embodiment of the present invention.

Attention is now directed to FIG. 6 which illustrates a second embodiment of the present invention and comprises a pair of housings 40 supported on a tray assembly 60. Tray assembly 60 is adapted mounted at the rear of a vehicle V for transporting housings 40.

Figure 7:
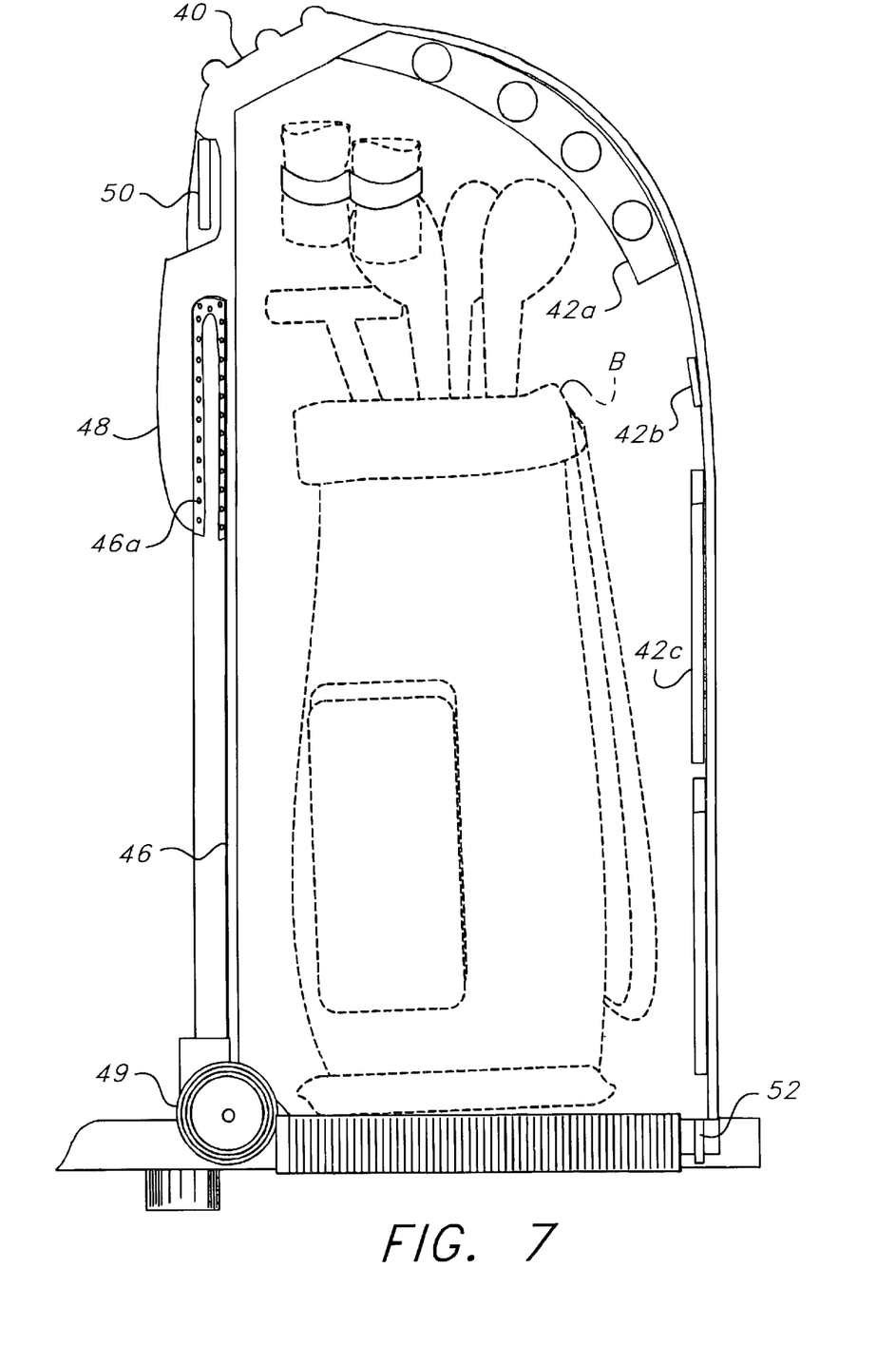
FIG. 7 is a sectional view of a golf bag carrier according to a second embodiment of the present invention.
Figure 8:
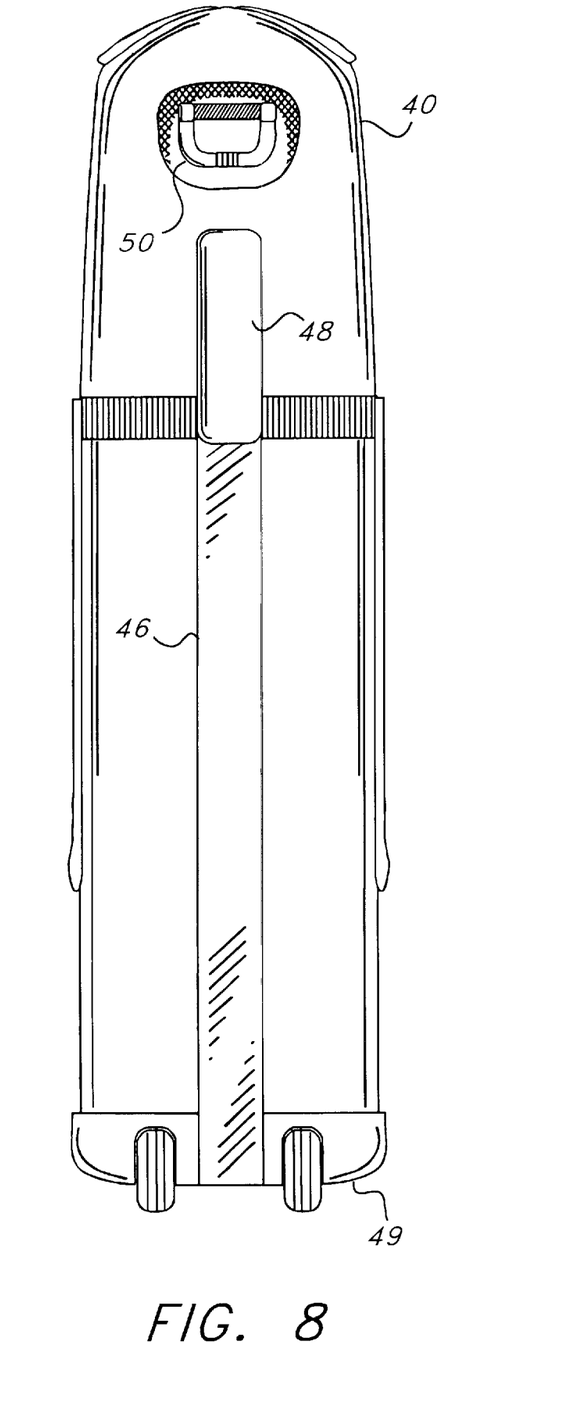
FIG. 8 is a rear view of a golf bag carrier according to a second embodiment of the present invention.

As best seen in FIGS. 6, 7 and 8, housing 40 is of one-piece, weatherproof design fabricated from hard, rugged, plastic material. The housing encloses a volume large enough to house a golf bag B containing a full set of golf clubs. The interior of housing 40 is cushioned at 40a to protect the bag and clubs when the housing is being transported. A cargo net (not shown) may also be provided to afford additional protection. A hinged door 42 is provided for conventionally covering an uncovering an opening formed in the front of the housing. Door 42 may be equipped with a handle and lock for added security. The interior of door 42 is equipped with a golf ball holder 42a, strapping 42b for holding tees and pockets 42c for holding desired miscellaneous items (the interior of door 12 may also be equipped in this manner). Upper and lower set-in handles 44 are disposed on the sides of the housing to enhance lifting onto and from the tray assembly.

A channel 46 is formed at lower rear end of the housing and extends upwardly from the lower rear end toward the upper end of the housing. As contemplated, channel 46 is approximately four and one-quarter inches wide and extends upwardly a distance of 40 inches. The upper portion of housing 40 is designed to form an overlap 48 for the upper portion of channel 46. The overlap is approximately eight inches in length. As best illustrated in FIG. 7, the upper portion of channel 46 is lined with rubber 46a for purposes as will be explained below. Wheels 49, positioned at the lower rear of the housing, and a retractable handle 50, positioned at the upper rear portion, provide means for wheeling the housing. A locking device 52 (explained below) is disposed at the lower front end of housing 40.

Figure 9:
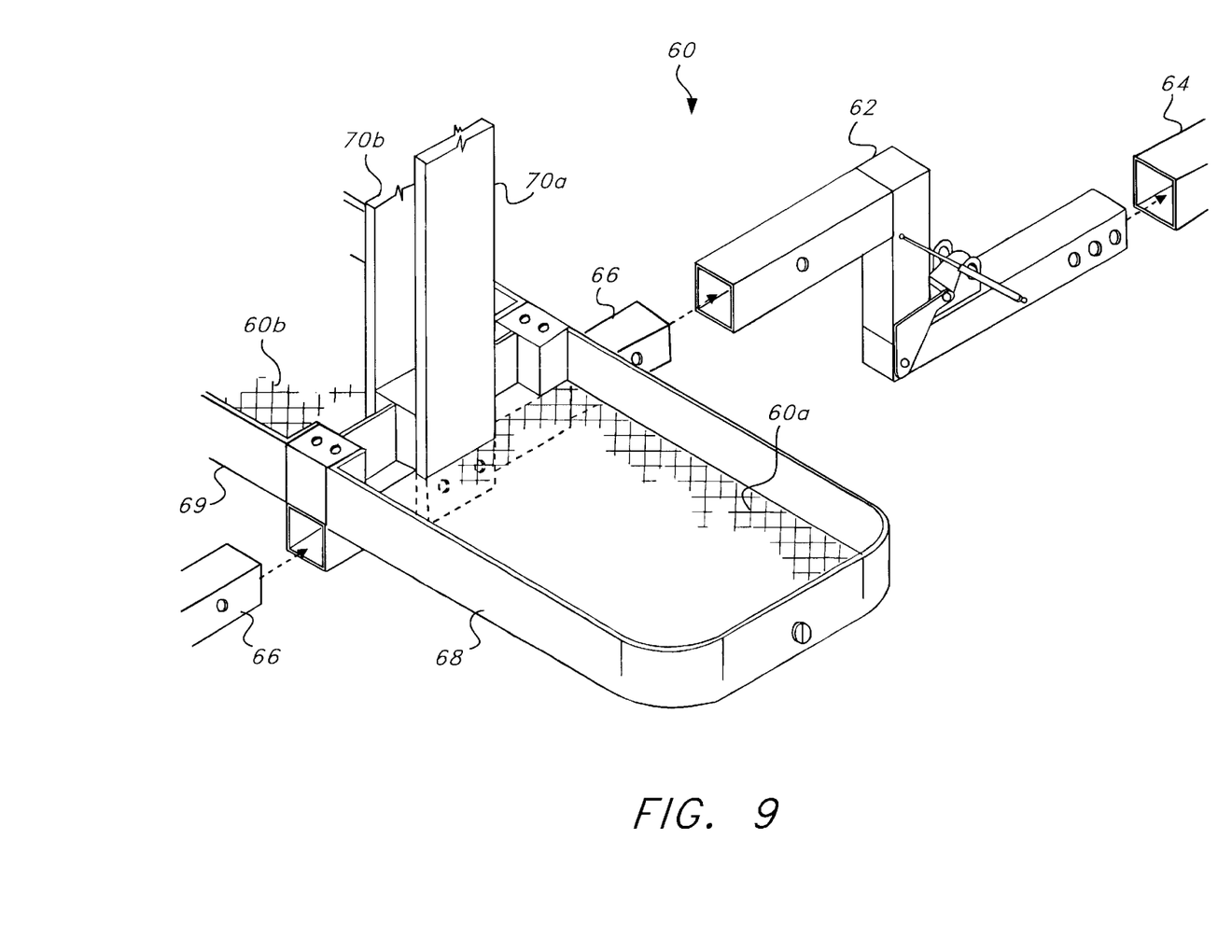
FIG. 9 is a partial, perspective, exploded view of carrier tray and hitch assembly according to a second embodiment of the present invention.
Figure 10:
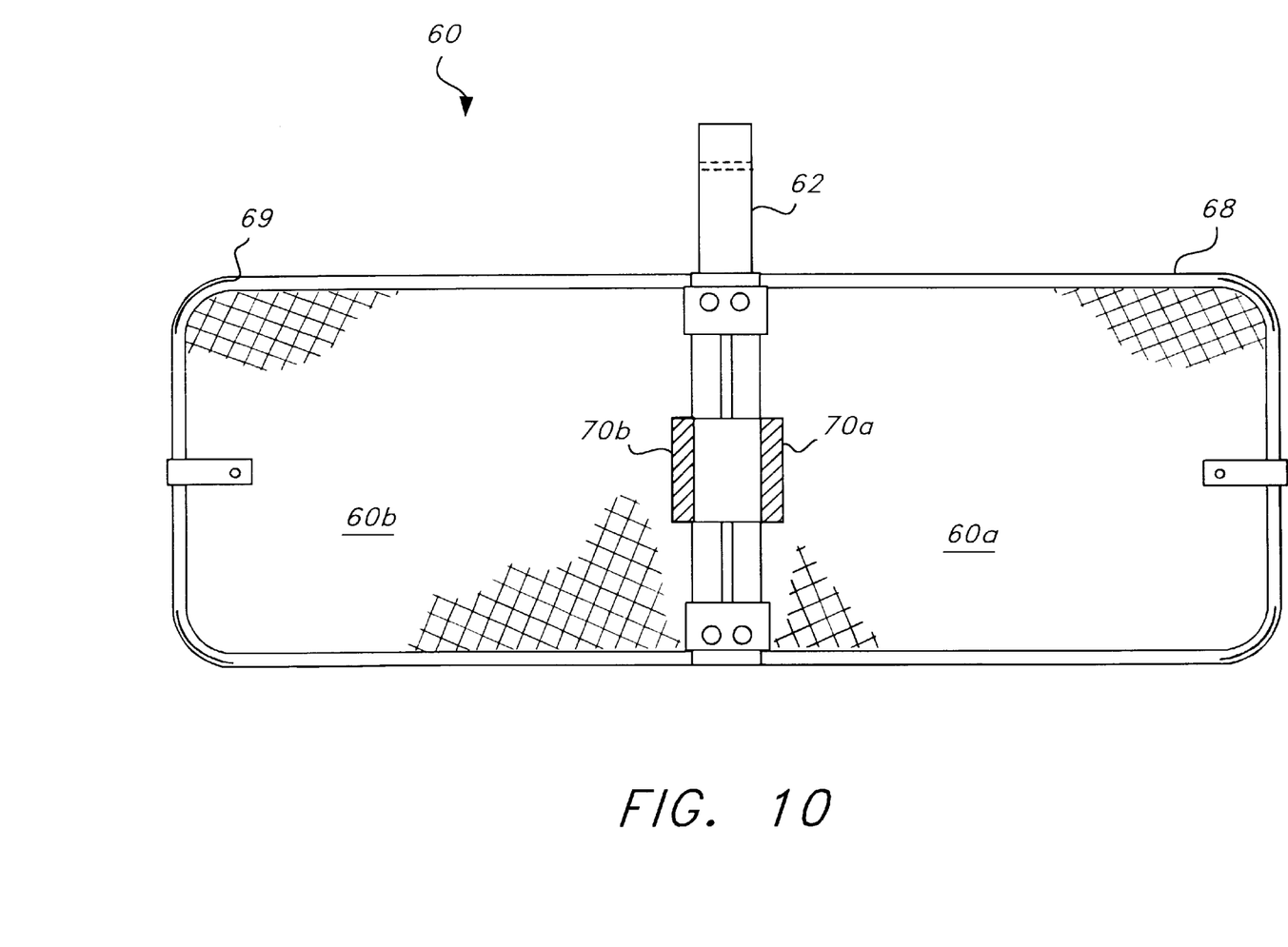
FIG. 10 is a top view of a carrier tray and hitch assembly according to a second embodiment of the present invention.

The tray assembly 60 (FIGS. 9 and 10) comprises a Z-shaped mounting base 62 adapted to be fastened to a conventional trailer hitch mounting bar 64. Housing support trays 60a and 60b are positioned and secured on base 62 via tubular members 66. Trays 60a, 60b have planar support areas whose perimeters are enclosed by upstanding rims 68, 69. Each area enclosed by rims 68, 69 approximates the area defined by the lower end of housing 40 whereby the lower end of housing 40 fits snugly within the confines of the tray. Respective channel bars 70a, 70b extend upwardly from each tray in face-to-face relationship. Channel bars 70a, 70b are of a width to fit within channel 46 of a respective housing 40. The length of the channel bars is such that each end terminates in a respective lined overlap area 48. The channel bars thus serve to secure the housings in back-to-back relationship for towing (FIG. 6). Locking device 52 is utilized to lock the housing to the tray and provide additional security therefor.

It is to be understood that the present invention is not limited to the sole embodiments described above, but encompasses any and all embodiments within the scope of the following claims.

I claim:

1. A combination golf equipment carrier and hitch assembly comprising:

an elongated rigid housing defining a volume of a capacity to contain a conventional golf bag having a full set of clubs therein, said housing having a front face, a rear face, a pair of side faces, an upper end and a lower end;

an opening formed in said front face;

a door hinged to said front face and covering said opening, said door having an interior surface; and means on said rear face for attaching said housing to said hitch assembly.

2. A combination golf equipment carrier and hitch assembly as recited in claim 1, wherein said volume is provided with padding whereby to protect the golf bag and set of clubs.

3. A combination golf equipment carrier and hitch assembly as recited in claim 2, including a pair of wheels, said pair of wheels positioned on said lower end of said housing at said rear face.

4. A combination golf equipment carrier and hitch assembly as recited in claim 3, further including a retractable handle, said handle disposed on said rear face of said housing adjacent said upper end; and at least one set-in handle disposed on each of said pair of side faces.

5. A combination golf equipment carrier and hitch assembly as recited in claim 4, further comprising;

a golf ball holder, strapping for holding tees and at least one pocket disposed on said interior surface of said door.

6. A combination golf equipment carrier and hitch assembly as recited in claim 5, wherein said means on said rear face comprises a tubular member having an exterior surface, an upper end and a lower end.

7. A combination golf equipment carrier and hitch assembly as recited in claim 6, wherein said lower end of said tubular member is flared.

8. A combination golf equipment carrier and hitch assembly as recited in claim 7, wherein said retractable handle is disposed in said upper end of said tubular member.

9. A combination golf equipment carrier and hitch assembly as recited in claim 8, wherein said hitch assembly comprises;

a T-shaped support member, said member having a leg portion and a head portion, said head portion having a front face and a rear face, said leg portion attached to and extending perpendicularly from said front face of said head portion, said leg portion being adapted to be fastened to a conventional trailer hitch mounting bar.

10. A combination golf equipment carrier and hitch assembly as recited in claim 9, including at least one stub member attached to said rear face of said head portion, said stub member adapted to be received in said flared end of said tubular member.

11. A combination golf equipment carrier and hitch assembly as recited in claim 10, including at least one mounting bracket attached to said front face of head portion; and means for encompassing a portion of said outer surface of said tubular member.

12. A combination golf equipment carrier and hitch assembly as recited in claim 11, wherein said means for encompassing comprises a U-shaped clip attached to said mounting bracket.

13. A combination golf equipment carrier and hitch assembly comprising:

an elongated rigid housing defining a volume of a capacity to contain a conventional golf bag having a full set of clubs therein, said housing having a front face, a rear face, a pair of side faces, an upper end and a lower end;

an opening formed in said front face;

a door hinged to said front face and covering said opening, said door having an interior surface;

a pair of wheels, said pair of wheels positioned on said lower end of said housing at said rear face;

a retractable handle, said handle disposed on said rear face of said housing adjacent said upper end; and at least one set-in handle disposed on each of said pair of side faces; and means on said rear face for attaching said housing to said hitch assembly.

14. A combination golf equipment carrier and hitch assembly as recited in claim 13, wherein said means on said rear face includes a vertically extending channel, said channel extending from said lower end of said housing to an area which is adjacent to and spaced from said upper end of said housing.

15. A combination golf equipment carrier and hitch assembly as recited in claim 14, wherein a portion of said housing overlaps said channel at said area which is adjacent to and spaced from said upper end of said housing; and a rubber padding disposed in said area to provide a lining for said area.

16. A combination golf equipment carrier and hitch assembly as recited in claim 15, wherein said hitch assembly comprises;

a first planar tray support structure, said first planar tray support structure having a proximate end and a distal end;

a first upstanding rim integral with and defining a perimeter of said first planar tray support structure, said perimeter of said first planar tray support structure being of a size to receive the lower end of said housing;

a first elongate, vertically extending channel bar attached to said first tray support structure at said proximate end.

17. A combination golf equipment carrier and hitch assembly as recited in claim 16, wherein said hitch assembly comprises;

a second planar tray support structure, said second planar tray support structure having a proximate end and a distal end;

a second upstanding rim integral with and defining a perimeter of said second planar tray support structure, said perimeter of said second planar tray support structure being of a size to receive the lower end of said housing;

a second elongate, vertically extending channel bar attached to said second tray support structure at said proximate end of said second planar tray support structure.

18. A combination golf equipment carrier and hitch assembly as recited in claim 17, wherein the proximate end of said first planar tray support structure is attached to the proximate end of said second planar tray support structure.

19. A combination golf equipment carrier and hitch assembly as recited in claim 18, including means for supporting said first planar support tray and said second planar support tray from a conventional trailer hitch.

20. A combination golf equipment carrier and hitch assembly as recited in claim 19, wherein said means for supporting includes a Z-shaped base support attached to said first planar support tray and said second planar support tray.

* * * * *